(12) United States Patent
Tsirkel et al.

(10) Patent No.: US 7,093,149 B2
(45) Date of Patent: Aug. 15, 2006

(54) TIERED SECONDARY MEMORY ARCHITECTURE TO REDUCE POWER CONSUMPTION IN A PORTABLE COMPUTER SYSTEM

(75) Inventors: Aaron Tsirkel, San Jose, CA (US); James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 10/457,884

(22) Filed: Jun. 9, 2003

(65) Prior Publication Data
US 2004/0250148 A1    Dec. 9, 2004

(51) Int. Cl.
*G11B 19/02* (2006.01)

(52) U.S. Cl. ............... 713/323; 713/300; 713/320; 713/321; 713/322; 713/324; 360/69; 360/75; 711/100; 711/114; 711/154

(58) Field of Classification Search ............... 713/300, 713/320–324; 360/69, 75; 711/100, 114, 711/154
See application file for complete search history.

(56) References Cited

U.S. PATENT DOCUMENTS

| | | | | |
|---|---|---|---|---|
| 6,009,518 A | * | 12/1999 | Shiakallis | 713/1 |
| 6,052,781 A | * | 4/2000 | Weber | 726/22 |
| 6,088,794 A | * | 7/2000 | Yoon et al. | 713/2 |
| 6,628,469 B1 | * | 9/2003 | Hoyt | 360/69 |
| 6,651,099 B1 | * | 11/2003 | Dietz et al. | 709/224 |
| 6,851,030 B1 | * | 2/2005 | Tremaine | 711/160 |
| 6,910,210 B1 | * | 6/2005 | Chew | 718/103 |
| 2003/0145166 A1 | * | 7/2003 | Miwa et al. | 711/114 |

* cited by examiner

*Primary Examiner*—A. Elamin
(74) *Attorney, Agent, or Firm*—Blakely, Sokoloff, Taylor & Zafman LLP

(57) ABSTRACT

A computer system that optimizes the power efficiency of a portable computer system is described. Specifically, the secondary memory of the system is partitioned. A standard hard disk drive is used to store lower utilization applications, while a micro storage unit is used to store high utilization applications.

22 Claims, 3 Drawing Sheets

TIERED SECONDARY MEMORY ARCHITECTURE TO REDUCE POWER CONSUMPTION IN A PORTABLE COMPUTER SYSTEM

FIELD OF THE INVENTION

The present invention pertains to the field of computer design. More particularly, the present invention relates to a method for optimizing power in a portable computer system.

BACKGROUND OF THE INVENTION

A computer system typically comprises a main memory and a secondary memory. Main memory or random access memory (RAM) refers to the physical system that is internal to the computer. The computer manipulates only the data that is in main memory. Therefore, programs that are executed and files that are accessed are typically copied into main memory. When the computer system is powered off, the data in main memory is typically not retained. The amount of main memory in a computer system determines how many programs can be executed at one time and how much data can be readily available to a program.

In contrast to main memory, the data in secondary memory is typically retained even after the system is powered off. Secondary memory allows large amounts of data to be stored. Examples of secondary memory include mass storage devices such as hard disks, floppy disks, optical disks, and tapes.

The secondary memory of a portable computer system typically comprises a single hard disk drive (HDD). The HDD consumes approximately 9% of a computer system's power. Approximately 90% of the battery life of a portable computer system is currently consumed during system bootup and by an idle operating system.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

HDDs consume power even when idle. Most traditional HDDs are 20 gigabytes or greater. Applications of a computer system may be stored in the hard disk drive. An application may comprise data and instructions.

In comparison to traditional HDDs, mini-HDDs store less data. For example, a mini-HDD may store one gigabyte of data. However, mini-HDDs may consume less power and provide higher reliability. Therefore, a system that utilizes a mini-HDD in addition to a traditional HDD may provide power savings by allowing the traditional HDD to be powered off during idle. The mini-HDD may be used for storing highly utilized applications.

Figure 1:
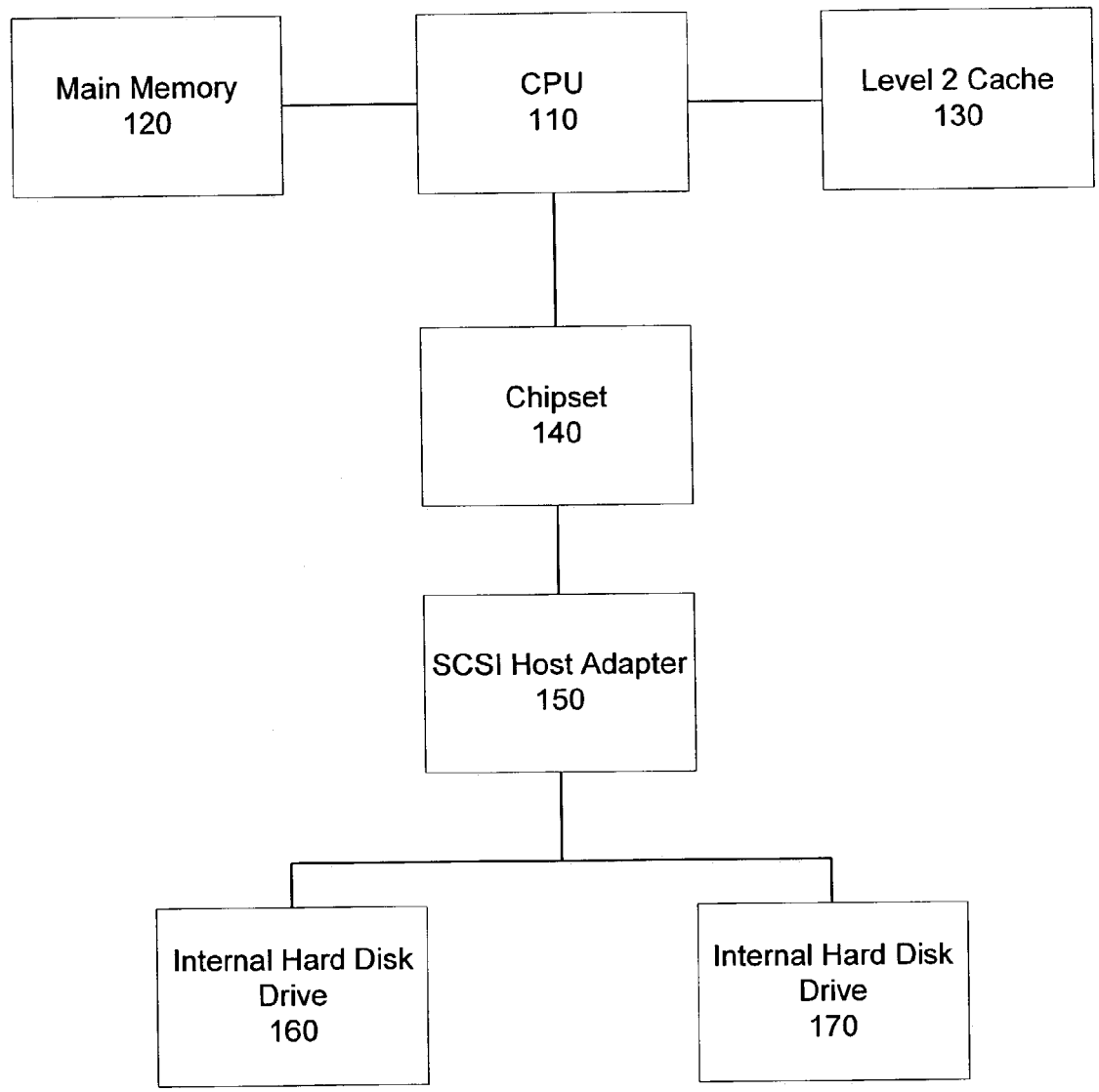
FIG. 1 is an embodiment of a computer system having a tiered secondary architecture.

FIG. 1 depicts a system having a tiered secondary memory architecture. CPU 110 is coupled to main memory 120, level 2 cache 130, and chipset 140. The CPU 110 may comprise an on-chip level 1 cache. The level 2 cache 130 temporarily stores data and instructions transferred to and from the CPU 110. Chipset 140 is coupled to SCSI host adapter 150. The SCSI host adapter 150 is coupled to a traditional HDD 160 and a mini-HDD 170. Both the traditional HDD 160 and the mini-HDD 170 are internal to the system.

Applications that are often accessed are stored in mini-HDD 170. Moreover, the operating system may also be stored on the mini-HDD 170. At powerup, the operating system may be loaded from the mini-HDD 170. Less often used applications are stored in the traditional HDD 160. Thus, when the CPU 110 wants to run an application from the mini-HDD 170, the applications are obtained from the traditional HDD 160 or the mini-HDD 170. The chipset 140 comprises buffers and memory address decoders to enable the CPU 110 to communicate with the traditional HDD 160 and the mini-HDD 170. The chipset 140 may also comprise a plurality of counters to track the number of times each application on the system is used. This enables the system to determine which applications are to be stored in the mini-HDD 170. For this embodiment of the invention, the mini-HDD may have a five gigabyte storage capacity.

The user may determine which applications are to be stored in mini-HDD 170. For instance, applications that the user deems to be most important may be stored in mini-HDD 170. Alternatively, the system may determine which applications are most important by the frequency of use.

The bridge between the chipset 140 and the traditional HDD 160 and the mini-HDD 170 may be a small computer system interface (SCSI) bus. If a SCSI bus is used, a SCSI host adapter 150 may be used to send and receive messages on the SCSI bus. The SCSI host adapter 150 may also check at powerup to confirm that the traditional HDD 160 and the mini-HDD 170 are properly connected to the bus.

Alternatively, the traditional HDD 160 and the mini-HDD 170 may be integrated device electronics (IDE) drives. The traditional HDD 160 and the mini-HDD 170 may be coupled to the chipset 140 without connection to a SCSI bus. The traditional HDD 160 and the mini-HDD 170 may comprise the control and interface electronics necessary to connect directly to the chipset 140.

For one embodiment of the invention, the system of FIG. 1 is a battery powered portable computer system. For another embodiment of the invention, the system is a cellular phone.

Figure 2:
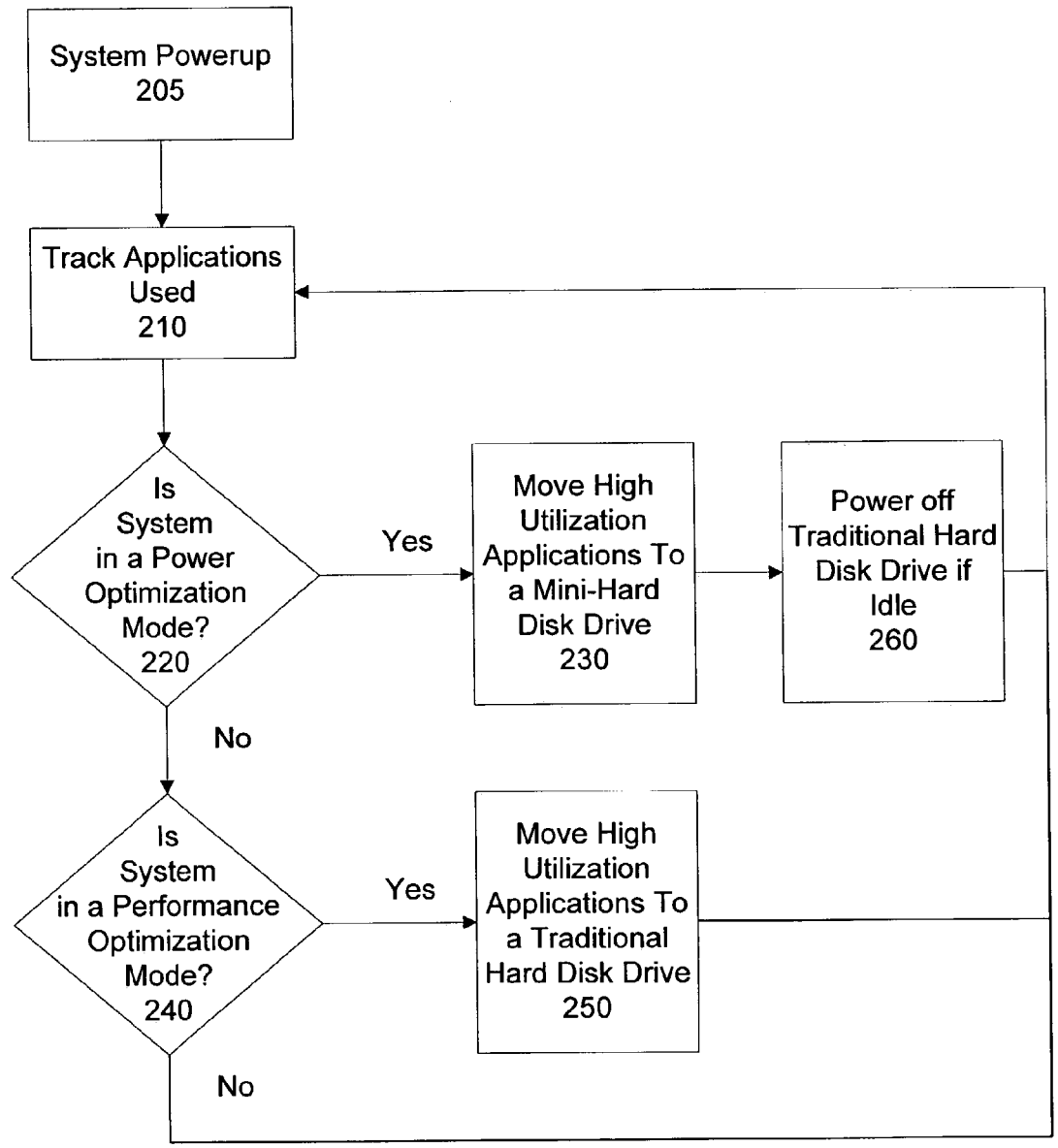
FIG. 2 is a flowchart for optimizing the power consumption of a computer system having a tiered secondary architecture.

FIG. 2 depicts a flowchart for optimizing the power consumption of a computer system having a tiered secondary architecture. Following system powerup 205, the applications run by the system are tracked in operation 210. The tracking may be performed by the operating system or a tracking circuit. The tracking circuit may comprise a plurality of counters or a state machine. The tracking circuit may be built using combinational logic. The tracking circuit may be integrated as part of the chipset 140. Operation 220 then determines if the system is in a power optimization mode. If the system is in a power optimization mode, then the applications that have a high utilization are moved to the mini-HDD 170 in operation 230. High utilization may be defined as applications that have been accessed the most number of times during a given time period. Operation 260 powers off the traditional HDD 160 when the traditional HDD 160 is idle to conserve power. Operation 210 continues to monitor application usage and moves applications to the mini-HDD 170 when appropriate. The traditional HDD 160 may be powered back when the system receives a request to access data from the traditional HDD 160.

If the system is not in a power optimization mode, operation 240 checks if the system is in a performance optimization mode. Some applications may offer improved performance if accessed from the traditional HDD 160. Thus, if the system is in a performance optimization, then the high utilization applications may be placed on the traditional HDD 160.

For another embodiment of the invention, the system automatically moves the high utilization applications to the mini-HDD 170 without determining whether the system is in a power optimization mode or a performance optimization mode.

Figure 3:
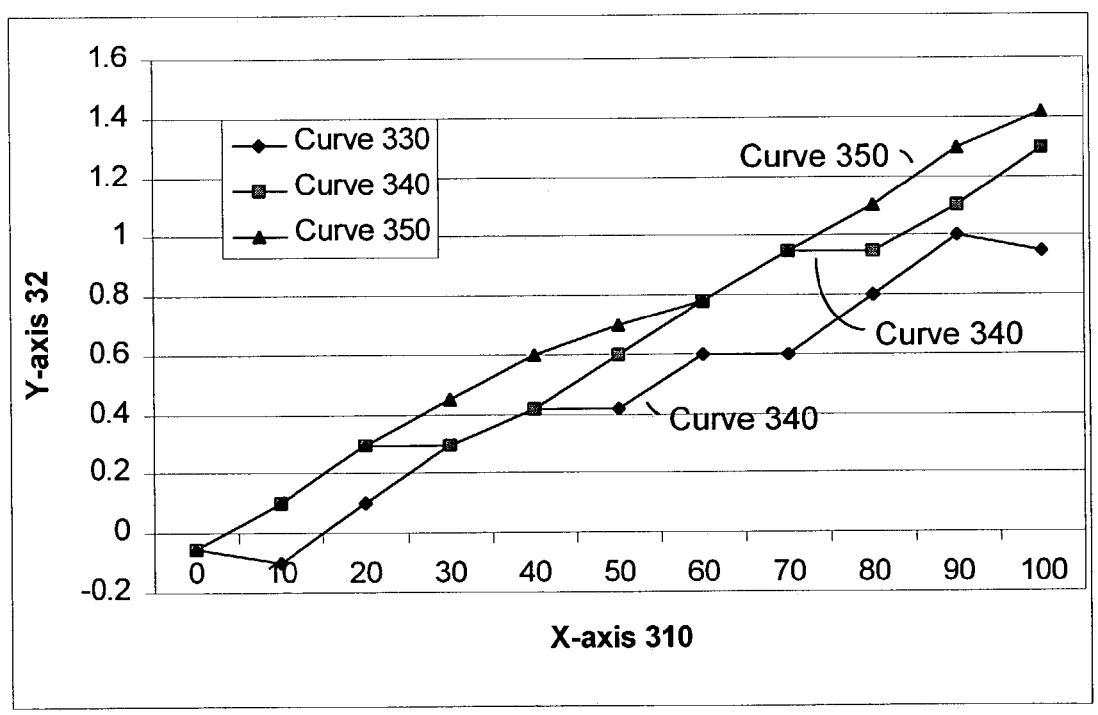
FIG. 3 is a graph of the power optimization of a computer system having a tiered secondary architecture in comparison with a computer system having a single secondary memory.

FIG. 3 depicts a graph of the power optimization of a computer system having a tiered secondary architecture in comparison with a computer system having a single secondary memory. X-axis represents a percentage utilization of a mini-HDD. Y-axis 320 represents the power saved in watts over a system having only a traditional HDD. A system having a mini-HDD may reduce power consumption during all states including active, idle, and suspend. In addition, power savings may be achieved during bootup. Each of the curves 330, 340, and 350 represent a system that utilizes both a mini-HDD and a traditional HDD. Curve 330 is a system that has 60 percent of its applications' capacity stored on a mini-HDD and 40 percent of its applications' capacity stored on a traditional HDD. Curve 340 is a system that has 80 percent of its applications' capacity stored on a HDD and 20 percent of its applications' capacity stored on a traditional HDD. Curve 350 is a system that has 90 percent of its applications' capacity stored on a HDD and 10 percent of its applications' capacity stored on a traditional HDD.

Curve 350 shows the greatest overall power savings over a system utilizing only a traditional HDD. For instance, when the mini-HDD of a system having 90 percent of its applications' capacity stored on the mini-HDD has 100 percent utilization, the system may conserve approximately 1.4 watts over a system that only uses a traditional HDD. In comparison, curve 340 shows that a system having 80 percent of its applications' capacity stored on a mini-HDD saves approximately 1.3 watts over a traditional HDD system at 100 percent utilization. Curve 330 shows that a system having 60 percent of its applications' capacity stored on a mini-HDD saves approximately 0.95 watts over a traditional HDD system at 100 percent utilization. Each of the curves 330, 340, and 350 show a reduction in power savings as the percentage utilization of the mini-HDD decreases. The less the mini-HDD is utilized, the more likely that the traditional HDD is not idle and thus consuming power. Power conservation may help to extend the battery life of the system.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

The invention claimed is:

1. A system, comprising:
   a processor;
   a first secondary memory having a first storage capacity coupled to the processor, wherein highly utilized applications of the system that are accessed a majority of the time are stored on the first secondary memory when the system is in power optimization mode, and
   a second secondary memory having a second storage capacity coupled to the processor, wherein the second storage capacity is greater than the first storage capacity, wherein the second secondary memory is powered off when the second secondary memory is in idle mode, and wherein the highly utilized applications of the system are stored on the second secondary memory when the system is in a performance optimization mode.

2. The system of claim 1, further comprising:
   a main memory coupled to the processor, wherein an application is accessed from the first secondary memory by the processor and stored in the main memory.

3. The system of claim 1, further comprising:
   a tracking device coupled to the processor, wherein the tracking device determines how often each application of the system is accessed.

4. The system of claim 3, wherein the tracking device is a counter.

5. The system of claim 3, wherein the tracking device is a state machine.

6. The system of claim 3, wherein the tracking device is implemented in software.

7. The system of claim 4, wherein the counter is integrated as part of a chipset.

8. The system of claim 1, wherein an operating system is stored on the first secondary memory.

9. A mobile computer, comprising:
   means for accessing a first internal hard disk drive;
   means for accessing a second internal hard disk drive, wherein the first internal hard disk drive consumes less power than the second hard disk drive, wherein the first internal hard disk drive has less storage capacity than the second hard disk drive;
   means for storing highly utilized applications of the computer that are utilized a majority of the time on the first hard disk drive when the mobile computer is in a power optimization mode; and
   means for storing the highly utilized applications on the second hard disk drive when the mobile computer is in a performance optimization mode.

10. The mobile computer of claim 9, further comprising:
    means for reducing power consumption during bootup of the mobile computer.

11. The mobile computer of claim 9, further comprising:
    means for reducing power consumption of the mobile computer during an active state;
    means for reducing power consumption of the mobile computer during an idle state; and
    means for reducing power consumption of the mobile computer during a suspend state.

12. The mobile computer of claim 9, further comprising:
    means for tracking a number of times applications of the mobile computer are accessed.

13. A method, comprising:

tracking applications of a system;

storing a subset of the applications that are accessed a majority of the time during a time period on a first hard disk drive when the system is in a power optimization mode; and storing the subset on a second hard disk drive if the system is in a high performance mode, wherein the first hard disk drive has less storage capacity than the second hard disk drive.

14. The method of claim 13, further comprising:

powering off the second hard disk drive if the second hard disk drive is in idle mode.

15. The method of claim 13, further comprising:

powering on the second hard disk drive if data on the second hard disk drive is accessed by a processor.

16. A computer system, comprising:

a first hard disk drive (HDD), wherein a first portion of the capacity of the computer system's applications is stored on the first HDD when the computer system is in a power optimization mode; and a second HDD coupled to the first HDD, wherein a second portion smaller than the first portion of the capacity of the computer system's applications is stored in the second HDD, wherein a first subset of the computer system's applications that are accessed a minority of the time is stored on the second HDD when the computer system is in a power optimization mode, wherein the first HDD has less storage capacity than the second HDD, wherein a second subset of the computer system's applications that are accessed a majority of the time is stored on the second HDD when the system is in a high performance mode, wherein the second HDD is powered off if the second HDD is in idle mode.

17. The computer system of claim 16, wherein the first HDD is a five gigabyte HDD.

18. The computer system of claim 16, wherein the second HDD is a 20 gigabyte HDD.

19. The computer system of claim 16, wherein an operating system is stored on the first HDD.

20. A computer system, comprising:

a processor having a level 1 cache;

a level 2 cache coupled to the processor, wherein the level 2 cache temporarily stores data and instructions transmitted to and from the processor;

a random access memory coupled to the processor, wherein the processor manipulates data in the random access memory;

a first hard disk drive coupled to the processor, wherein the first hard disk drive stores a first application; and a second hard disk drive coupled to the processor, wherein the second hard disk drive stores a second application when the system is in a power optimization mode, wherein the second application is more frequently accessed than that first application, wherein the second hard disk drive has less storage capacity than the first hard disk drive, and wherein the second application is stored on the first hard disk drive when the system is in a performance optimization mode.

21. The computer system of claim 20, further comprising:

a circuit to track the amount of times the first and second applications is run by the processor, wherein the first application is moved to the second hard drive and the second application is moved to the first hard drive if the circuit determines that the first application is run by the processor more frequently than the second application.

22. The computer system of claim 20, wherein the first hard drive is turned off if the first hard drive is idle.

* * * * *